July 24, 1951　　　J. G. LEWIS ET AL　　　2,561,386
STEREOBLIQUE PLOTTER

Filed Jan. 10, 1945　　　　　　　　　　　　　8 Sheets-Sheet 2

Fig. 2.

INVENTORS
JAMES G. LEWIS and
JAMES L. BUCKMASTER
BY ATTORNEY J. T. Motherhead

July 24, 1951 J. G. LEWIS ET AL 2,561,386
STEREOBLIQUE PLOTTER
Filed Jan. 10, 1945 8 Sheets-Sheet 3

INVENTORS
JAMES G. LEWIS and
JAMES L. BUCKMASTER
BY
ATTORNEY

July 24, 1951  J. G. LEWIS ET AL  2,561,386
STEREOBLIQUE PLOTTER

Filed Jan. 10, 1945  8 Sheets-Sheet 4

JAMES G. LEWIS and
JAMES L. BUCKMASTER
INVENTORS

BY *J. Moorhead*
ATTORNEY

July 24, 1951  J. G. LEWIS ET AL  2,561,386
STEREOBLIQUE PLOTTER Filed Jan. 10, 1945  8 Sheets-Sheet 5

JAMES G. LEWIS and
JAMES L. BUCKMASTER
INVENTORS

BY
ATTORNEY

July 24, 1951  J. G. LEWIS ET AL  2,561,386
STEREOBLIQUE PLOTTER
Filed Jan. 10, 1945  8 Sheets-Sheet 6

JAMES G. LEWIS and
JAMES L. BUCKMASTER
INVENTORS

ATTORNEY

July 24, 1951  J. G. LEWIS ET AL  2,561,386
STEREOBLIQUE PLOTTER
Filed Jan. 10, 1945  8 Sheets-Sheet 7

JAMES G. LEWIS
JAMES L. BUCKMASTER
INVENTORS

BY *J. T. Mothershead*
ATTORNEY

July 24, 1951　　　　J. G. LEWIS ET AL　　　　2,561,386
STEREOBLIQUE PLOTTER
Filed Jan. 10, 1945　　　　　　　　　　　　　　　8 Sheets-Sheet 8

Fig. 14.

INVENTORS
JAMES G. LEWIS and
JAMES L. BUCKMASTER
BY
ATTORNEY

Patented July 24, 1951

2,561,386

UNITED STATES PATENT OFFICE 2,561,386

STEREOBLIQUE PLOTTER

James G. Lewis, Siloam, Ga., and James L. Buckmaster, Arlington, Va., assignors to the United States of America as represented by the Secretary of the Interior Application January 10, 1945, Serial No. 572,202

7 Claims. (Cl. 33—20)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

Our invention provides a means for plotting rectified planimetric maps directly from oblique aerial photographs, two of said photographs being used which embrace over-lapping terrain. The aerial photographs commonly used for this purpose are taken from aircraft along flight lines, the photographic records of each flight containing many overlapping photographs.

The photographs of each flight are divided into groups of two which include common image points. These are analyzed, then common image points are selected and marked for easy identification on the prints. By the use of successive groups of photographs the entire area is mapped. By mechanism, hereinafter described, the various photographs in perspective or direct views, are translated to a common view point and then drawn on a map.

Our plotting device is adapted to rest upon and be manually moved over a base 21 upon which a plotting sheet 22 is placed. A lower support plate 23 (Fig. 2) is provided with a plurality of suitably spaced feet 24 and 25 on which our device rests.

Figures 4, 5, 6:
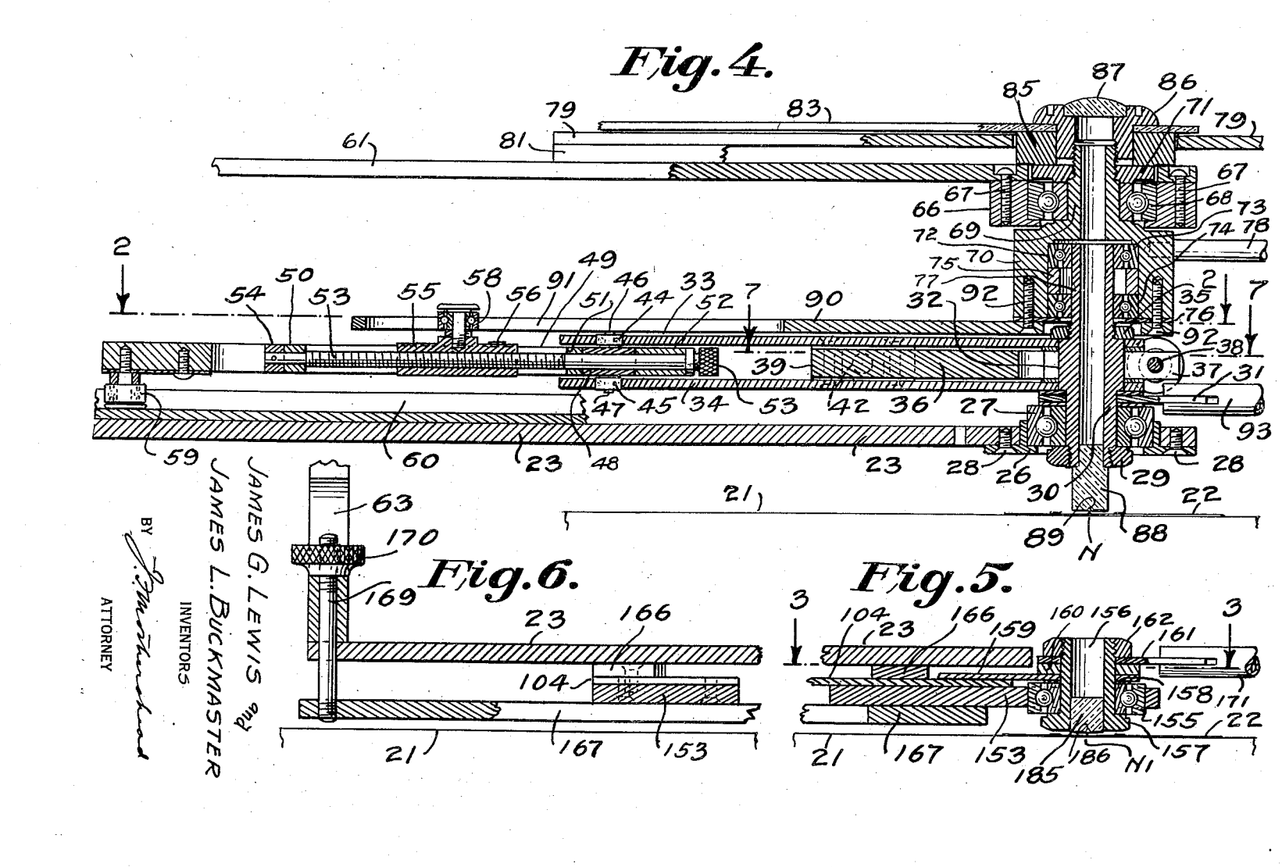
Figure 4 is a vertical longitudinal enlarged detailed sectional view through one of our pivotal bearings and associated parts.
Figure 5 is a vertical longitudinal section through another pivoted bearing on the line 5—5 of Figure 2.
Figure 6 is a vertical section taken on line 6—6 of Figure 2 showing means for adjustably locking certain members shown in Figure 3.

Referring to Figure 4: A bearing retainer 26 projects through an aperture in the plate 23 for the reception of a ball bearing assembly 27, said retainer being secured to the base plate 23 by screws 28 or the like. A nut 29 secures a hollow bearing shaft 30 in the assembly 27 and provides a clamping means for a plotting arm plate 31 which surrounds the bearing shaft 30 below an enlargement 32 formed on the shaft 30.

Figures 7, 8, 9:
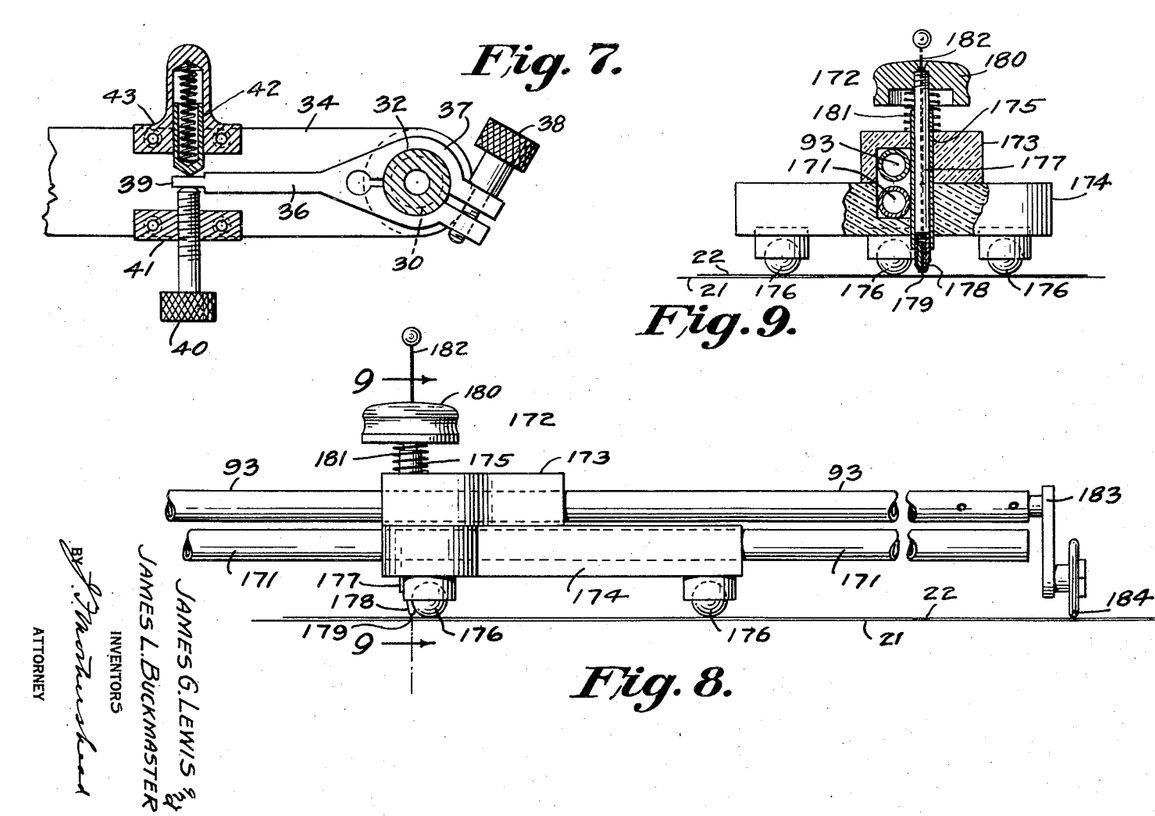
Figure 7 is an enlarged detail horizontal section taken on line 7—7 of Figure 4.
Figure 8 is an enlarged detail side elevation of two plotting arms with a slidable carriage mounted thereon.
Figure 9 is a detail elevation, partly in section on the line 9—9 of Figure 8.

Upper and lower link members 33, 34 are rotatably mounted upon the enlargement 32, and are held in alignment by a nut 35 on threads above the enlargement 32. Between the link members 33 and 34 is an adjusting arm 36 (Fig. 7) having a clamping collar 37 surrounding the enlarged portion 32. A clamping collar 37 is provided with a clamping screw 38 by means of which the links 33 and 34 are clamped in an approximate desired angular relation to the shaft 30; then a finer adjustment is obtained between an outer end 39 of the adjusting arm 36 and our links 33, 34 by means of a tangent screw 40, threaded into a spacer block 41 and a spring pressed plunger 42 housed in a second spacer block 43. Both spacer blocks 41 and 43 are secured between and to the links 33, 34. The links 33, 34 are also provided with pivotal bearings 44 and 45 to receive stud shafts 46 and 47 mounted on a collar 48 which form a pivotal point for a slotted link assembly 49 having portions transverse of the slot for bearings 50, 51 and 52 for a knurled adjusting screw 53. A collar 54 is pinned to a reduced end portion of the screw 53 to secure the latter against longitudinal movement. The collar 48 has a smooth bore which enables it to be assembled between bearings 51 and 52, on the unthreaded portion of the screw 53.

Figure 2:
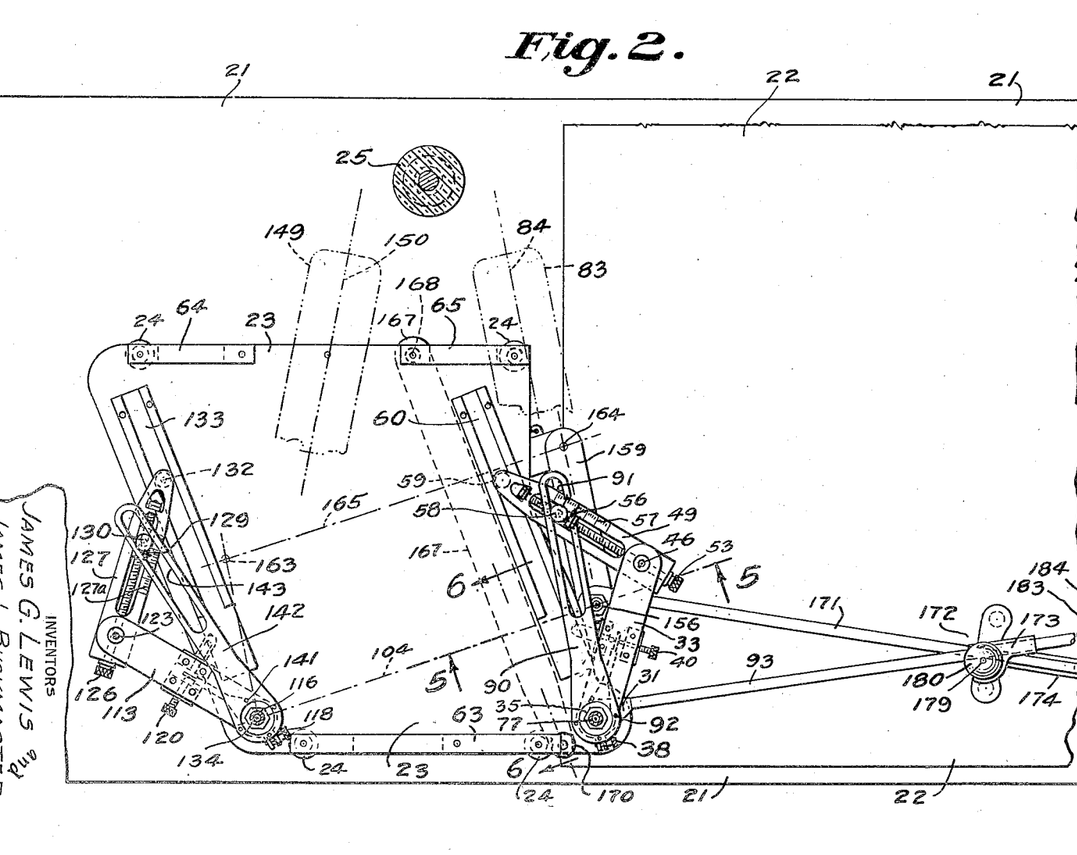
Figure 2 is a horizontal view on the line 2—2 of Figure 4.

A threaded sleeve 55 is assembled along the threaded portion of the screw 53 and carries a pointer 56 adapted to indicate a desired reading on a graduated scale 57 along the upper face of the link 49 (Fig. 2). The graduations of the scale 57 represent template settings corresponding to degrees of tilt, for use in conjunction with the pointer 56 for setting our instrument to correspond with the measured tilt value of an oblique aerial photograph. The sleeve 55 also supports on its upper face a pivotal bearing 58.

The outermost end of the link 49 is provided with a downwardly projecting roller bearing 59 which travels between fixed guide rails 60 that are rigidly secured to the base plate 23, thus restricting travel of the roller bearing 59 along a fixed line perpendicular to the axis of the shaft 30.

An intermediate plate 61 provided with marginal scale graduations 95 for supporting a photograph 62 (Fig. 1) is connected to the lower support plate 23 by means of spacer blocks 63, 64, 65. The graduations 95 are laid off in inches and fractions of inches measured from the axis of the hollow shaft 30 perpendicular to the edge of the plate 61 nearest to said axis. A bearing retainer 66 is secured to the underside of the intermediate support plate 61 by screws 67. A ball bearing assembly 68 is mounted on a hollow bearing shaft 69 and is retained against an enlarged portion 70 of the shaft 69 by a nut 71.

Within the enlarged portion 70 is an annular recess 72 for ball bearing assemblies 73 and 74 separated by a ring spacer 75 and a retainer washer 76. The ball bearing assemblies 73, 74 of the hollow bearing shaft 69 are mounted on an upper reduced portion 77 of the hollow shaft 30, thereby permitting adjustments of the mechanism carried by the lower hollow shaft 30 and the upper hollow shaft 69 independently of each other. Provision is made for taking up lost motion between the linkages by a radially extending pin 78 in the shaft enlargement 70 to which a tension spring 94 may be attached and extend to a like pin 144 mounted in a corresponding assembly shown in detail in Figure 13.

Figures 11, 12:
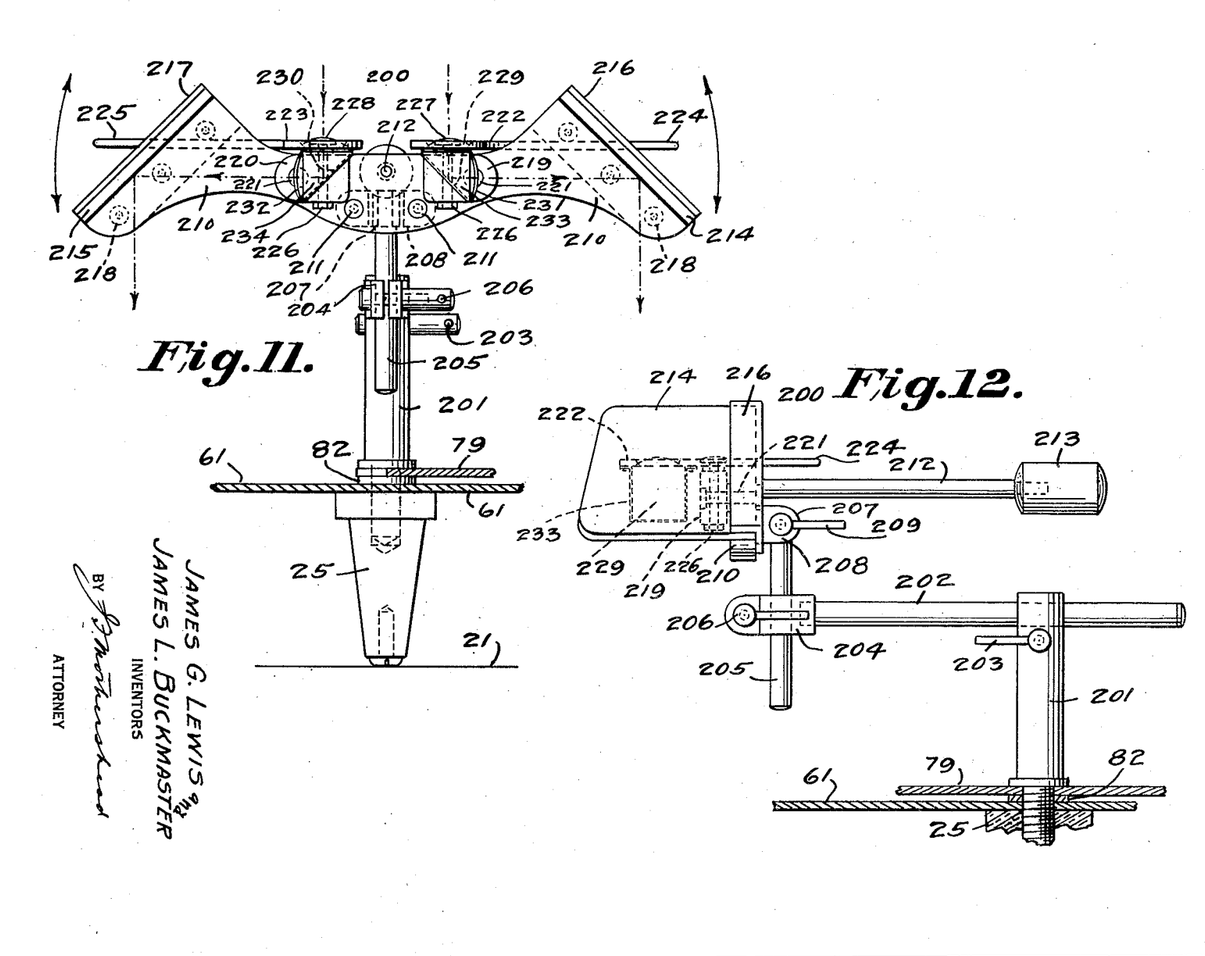
Figure 11 is a front elevation of our improved stereoscope shown in plan view in Figure 1.
Figure 12 is a side elevation of our stereoscope shown in Figure 11.
Figure 13:
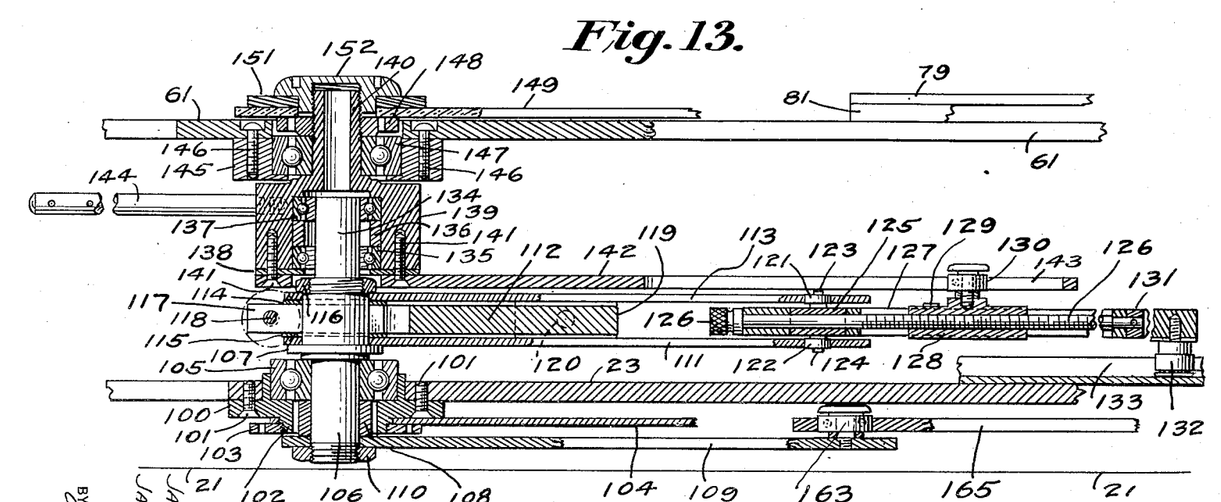
Figure 13 is a vertical longitudinal enlarged detailed section similar to the section of Figure 4, but through another one of our pivoted bearings.
Figure 14:
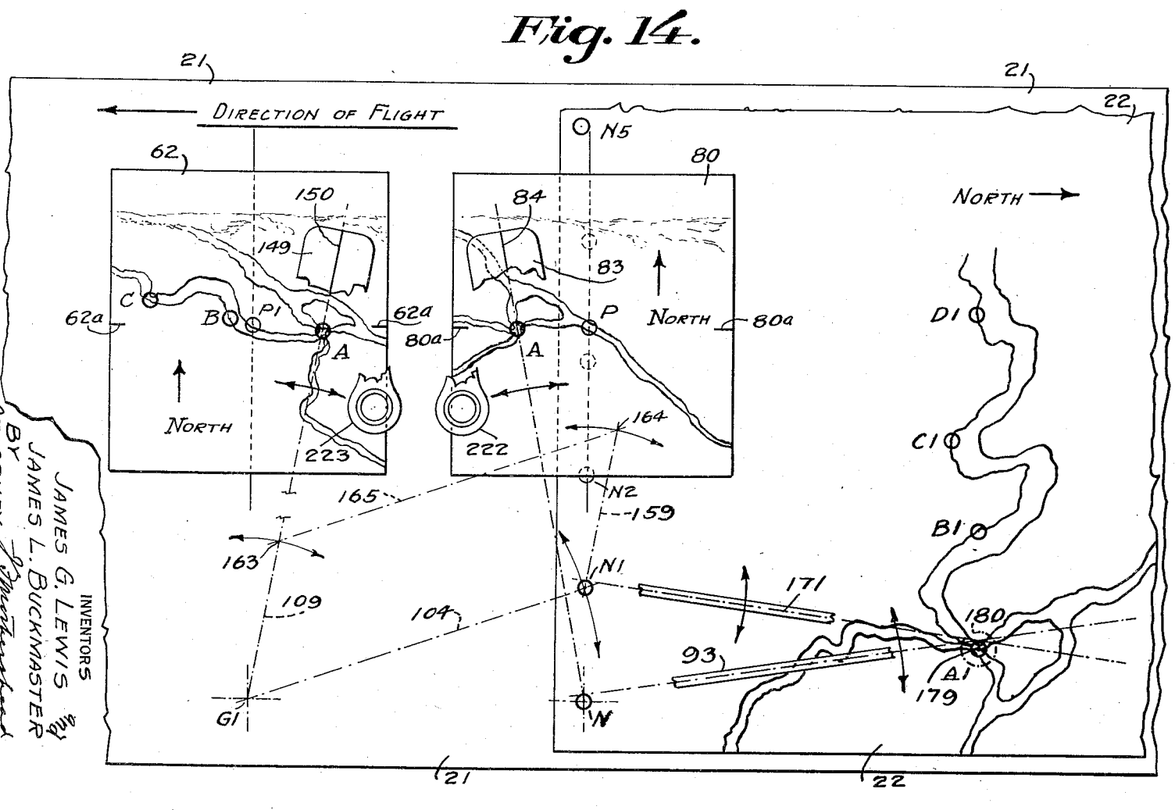
Figure 14 is a diagrammatic plan view, with parts omitted for clearness, showing the arrangement of two photographs and the resultant rectified lines produced on a plotting sheet.

An upper plate 79 having marginal graduations 96 supports a photograph 80 (Fig. 1), corresponds to, and is mounted above the plate 61, to the right of the center line of our device and is separated from the plate 61 by suitable spacers 81 and 82 (Figs. 4, 12 and 13). A transparent blade 83 having on its lower face a longitudinal hairline 84 (Fig. 1) is clamped against an annular spacer 85 (Fig. 4) by a clamping sleeve 86 in which is mounted a lens 87. The blade 83 is oscillated by movements of the hollow shaft 69. The hollow shaft 30 is closed by a downwardly protruding transparent plug 88, of suitable material, and has a central indentation 89 to assist in centering the axis of the shaft 30 over a selected mark "N" upon a mapping sheet. An arm 90 provided with a longitudinal slot 91 is fastened by screws 92 to the enlargement 70 which also secure the retainer washer 76 for the ball bearing assemblies 73 and 74. Motion is transmitted through a plotting arm 93, rigidly secured to the plate 31, to the hollow shaft 30 and the linkages associated therewith to the pivotal bearing 58 in the slot 91 and by means of the arm 90 and the hollow shaft 69 to the blade 83.

Referring to Figure 13, a left-hand bearing assembly differs in certain details from that shown in Figure 4.

A bearing retainer 100 is mounted in an aperture in the lower support plate 23, is fastened thereto by screws 101, and is provided with a downwardly extended portion 102, having an offset shoulder and a terminal thread for a nut 103 which retains a radial link 104 freely mounted about the portion 102. A ball bearing assembly 105 for a bearing shaft 106 is supported in the retainer 100. The bearing shaft 106 has a flange 107 providing abutments. A spacing collar 108 and an arm 109 are rigidly clamped by a nut 110.

A lower link member 111, an adjusting arm 112 and an upper link member 113 are rotatably mounted above the flange 107 on the shaft 106, together with spacing washers 114 and 115 and are held in adjustment by a nut 116 on terminal threads on the shaft 106. The adjusting arm 112 is provided with a clamping collar 117 and a clamping screw 118. An outer end 119 of the adjusting arm 112 is held in position by a tangent screw 120 identical with 40 (Fig. 7) which discloses an identical means for securing a fine adjustment. The links 111 and 113 are also provided with pivotal bearings 121 and 122 to receive stud shafts 123 and 124 mounted on a collar 125 on a knurled adjusting screw 126. The adjusting screw 126 is carried by a slotted link 127 marked with a scale 127a identical with 57 on link 49 and is shown in plan view at the left in Figure 2. A threaded sleeve 128 on the adjusting screw 126 is provided with a pointer 129 and an upwardly extending pivotal bearing 130. A collar 131 is pinned to a reduced end portion of the screw 126 to secure the latter against longitudinal movement. A downwardly projecting roller bearing 132 travels between fixed guide rails 133 rigidly secured to the base plate 23, thus restricting travel along a fixed line perpendicular to the axis of the shaft 106.

Mounted upon an upper portion 134 of the shaft 106 are a ball bearing assembly 135, a ring spacer 136, a second ball bearing assembly 137, and a retainer washer 138, the latter being rigidly secured to a hollow enlarged portion 139 of a shaft 140 by screws 141. The screws 141 also fasten to the shaft enlargement 139 an arm 142 having a longitudinal slot 143. A pin 144 extends laterally from the shaft enlargement 139 and provides means for attaching the tension spring 94.

A bearing retainer 145 is secured to the underside of the intermediate support plate 61 by screws 146. A ball bearing assembly 147 in the bearing retainer 145 is mounted on the shaft 140 and is retained by a lock nut 148. A transparent blade 149 provided on its underside with a longitudinal hairline 150 is clamped on the shaft 140 against the lock nut 148 by a washer 151 and cap nut 152.

Referring to Figures 3, 5, 6 and 13: On the free end of the radial link 104 is an offset extension 153 fastened thereto by screws 154. The extension 153 is provided with an aperture into which a ball bearing assembly 155 is pressed. A hollow floating shaft 156 has an integral head 157. A transparent plug 185 is forced into the shaft 156 and is provided with a centering identation 186. The shaft 156 is forced into the ball bearing assembly 155. A washer 158, an arm 159, a spacer 160 and a plate 161 are mounted on the movable shaft 156 and are clamped thereto by means of a nut 162.

The arms 109 and 159 (Fig. 3) are pivotally connected at 163 and 164 to a link 165 and at 106 and 156 to the radial link 104, thus forming a parallelogram. This parallelogram may be swung about the shaft 106, except when one of the links is held against moving as described hereafter. To the radial link 104 is rigidly secured an upwardly extending lug spacer 166. A clamping link 167 is secured by a screw 168 to the lower support plate 23 and a screw 169 which passes downwardly through a bore in the spacer block 63 (Fig. 6) and into the link 167. A knurled nut 170 on the screw 169 draws the clamping link 167 against the extension 153 of the radial link 104, and also draws the lug spacer 166 against the support plate 23 thereby holding the link 104 against movement relative to the support plate 23, and restricting the movement of the remaining links of the parallelogram to arcuate movements on the pivots 106 and 156. A slotted end of a plotting arm 171 is rigidly secured to the plate 161.

Referring to Figures 1, 2, 8 and 9: A plotting carriage 172 is formed of an upper member 173 and a lower member 174 which are pivotally united by a hollow sleeve 175. The members 173 and 174 are provided with grooves for slidably engaging the plotting arms 93 and 171. The lower member 174 is provided with ball rollers 176. Slidably mounted in the hollow sleeve 175 is a lead holding barrel 177 provided on its lower end with a clutch 178 for a marking lead 179. The upper end of the barrel 177 is threaded into a control knob 180 which is supported by a compression spring 181 thereby holding the lead 179 out of contact with a mapping sheet. A stylus 182 is provided within the barrel 177 as a convenient means for feeding the lead 179 as it is worn away. The outer end of the plotting arm 93 is provided with a bracket 183 secured thereto on which is mounted a supporting wheel 184.

Figure 1:
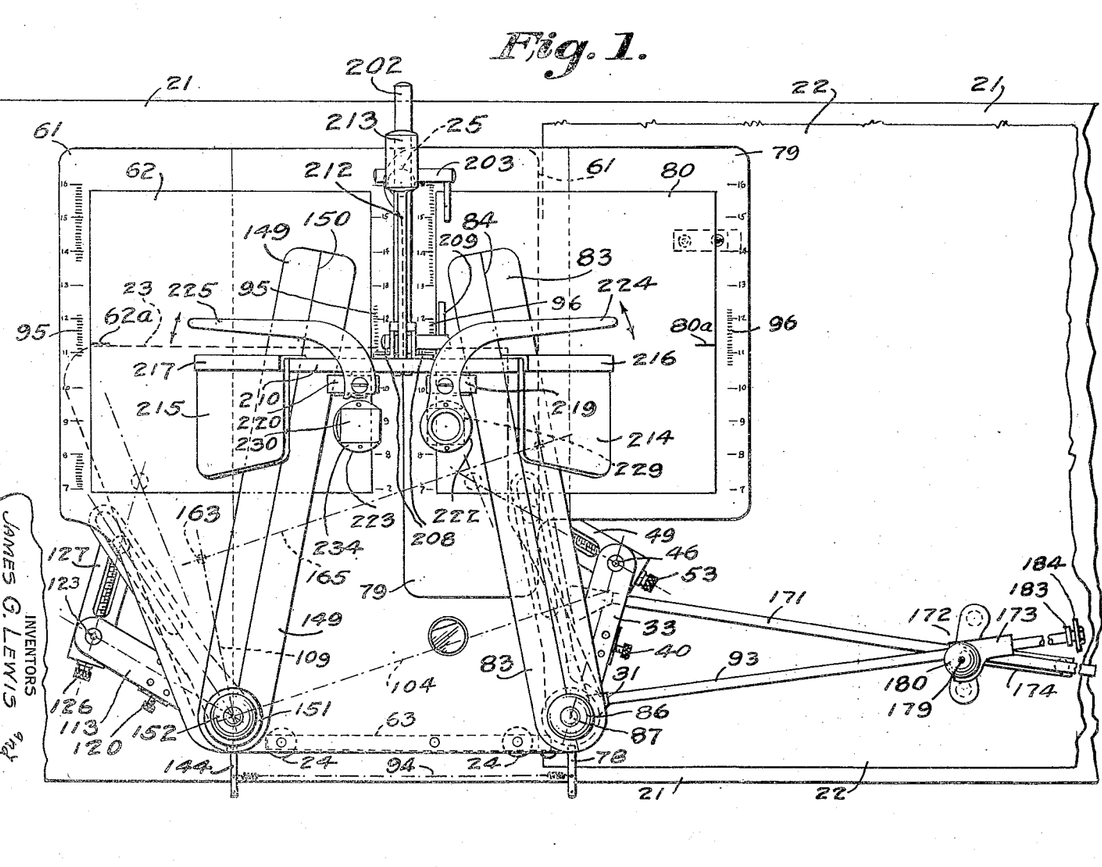
Figure 1 is a plan view of our stereoblique plotter.

Referring to our stereoscope 200 shown in Figures 1, 11 and 12: A base pedestal 201 is mounted in apertures in the upper photograph support 79 and the intermediate plate 61 by means of a threaded extension into the foot 25. The pedestal 201 supports a horizontal adjusting arm 202 by a clamping screw 203. The arm 202 is provided with a clamping collar 204 which in turn supports a vertical adjusting rod 205. The rod 205 is secured in position by a clamping screw 206. The rod 205 is provided with a block 207 mounted between angle brackets 208 by a clamping screw 209. The brackets 208 support a plate 210 by means of screws 211. An arm 212 extends rearwardly from the plate 210 and is provided with a balancing weight 213. Right and left mirrors 214 and 215 are secured to the outermost ends of the plate 210 by angles 216 and 217 and screws 218. The mirrors 214 and 215 are silvered on their under sides instead of on their rear faces to eliminate the passage of light through the glass plates. Right and left-hand blocks 219 and 220 are pivotally attached to the plate 210 by horizontally located screws 221, and support eye pieces 222 and 223 having adjusting arms 24 and 225 which are in turn pivotally attached to the blocks 219 and 220 by vertically located screws 226.

Right and left-hand lenses 227 and 228 are mounted on prisms 229 and 230 so as to be sighted through the eye pieces 222 and 223. Objective lenses 231 and 232 are also located on the prisms 229 and 230. These lenses may be cemented to the prisms or made integral therewith. The prisms 229 and 230 are mounted in housings 233 and 234 which are secured to the undersides of the eye pieces 222 and 223.

Figures 3, 10:
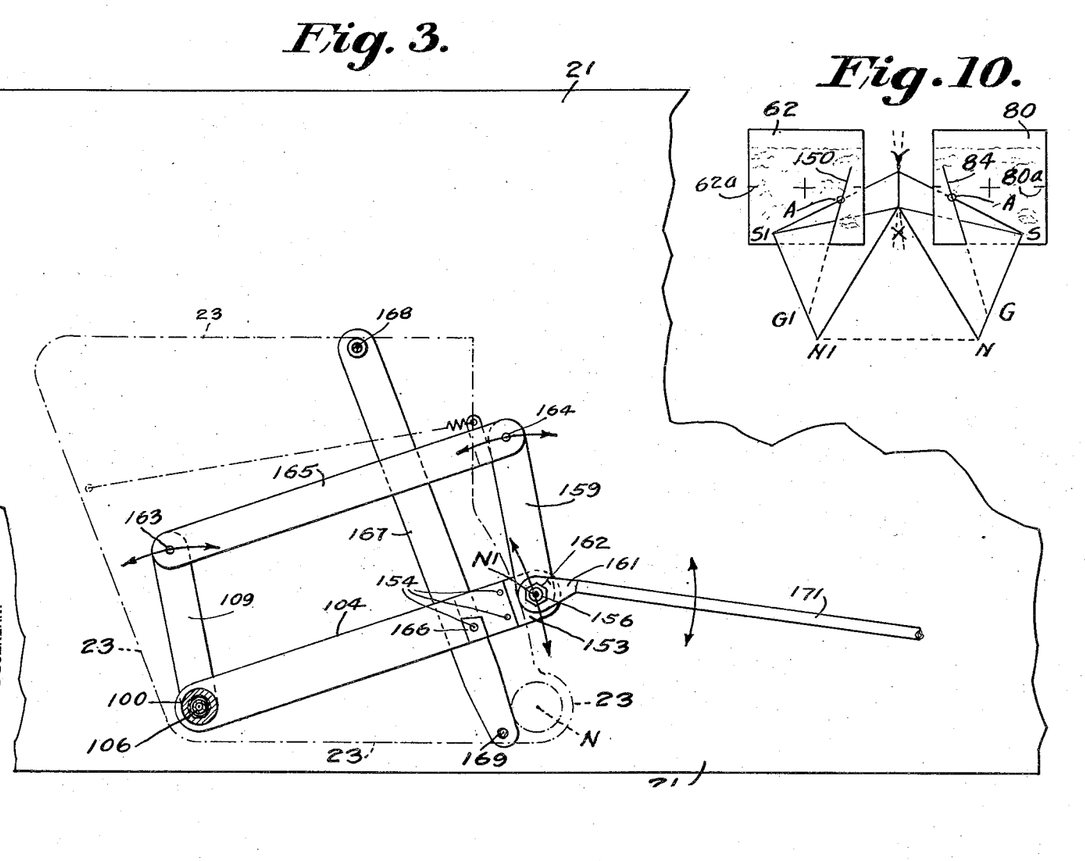
Figure 3 is a view similar to Figure 2 on the line 3—3 of Figure 5.
Figure 10 is a diagrammatic view illustrating the wandering line phenomenon of our plotter as seen through our stereoscope.

Figure 10 is a diagram to picture the wandering line phenomenon of the stereoblique plotter. For simplicity the stereoscope has been omitted from this diagram and can be covered by stating that by its use the eyes of the observer are in effect placed at the respective positions S and S1. GA and G1—A are the hairlines 84 and 150 of the plotter. Points A are identical images on these lines, thus having the same object X in the stereoscopic image, and on this setting are the only such identical points on the hairlines 84 and 150. XY is the stereoscopic image of the swinging hairlines 84 or 150, the lines appearing vertical for a short distance and separating in the air above ground. NX and N1—X are horizontal direction lines from the ground nadirs N and N1 to the object X and are the rectified radials GA and G1—A.

In a reconnaissance mapping program in which three-lens or trimetrigon photography is used, the photographs are taken along parallel flight strips and spaced approximately twenty-five miles apart. Thus, each exposure station will furnish three photographs of the surrounding area, one looking to the right, one to the left, and one directly downward. The photographs to the right and left of the plane are commonly called obliques. The present invention is used to obtain a planimetric map of the area covered by the oblique photographs. A short description is given of the preliminary steps in trimetrigon mapping in order to show the object and use of the present invention. As the first step, the photographs of a particular flight strip are examined and common image points located throughout the flight strip. The photographs are then analyzed for tilt and azimuth lines are drawn between successive vertical photographs. The photo-angulator (Patent 2,364,082, James G. Lewis, December 5, 1944) is then used to draft common direction lines on transparent sheets of paper, these lines originating from the point directly beneath the plane at the instant of exposure. These paper templet sheets are made for each exposure station throughout the flight strip and also for all parallel flight strips in the area to be mapped. Later, a metal reproduction using thin slotted metal strips is made for each of the paper templets. The metal templets are then assembled over a layout table on which has been placed the sheet to be used for mapping. The templets are joined in correct squence, being fixed to points or known geographic position and thus a position is determined for each point selected on the photographs. The centers of the metal templets will represent the ground nadir points throughout the flight strip. These points and all other intersecting points are marked on the map sheet which is then cut into strips along lines connecting successive ground nadir points. Each individual strip will be placed under the present instrument for drawing the planimetric map.

The first two oblique photographs 80 and 62 whose points occur on the mapping sheet are selected for use in the instrument. A photograph 80 bearing marginal marks 80a parallel to the true horizon of the photograph is placed on the right photograph support 79 under the transparent blade 83 and positioned thereon relative to the inscribed scale 96 on support 79 and is also so located that the principal point "P" is under the hairline 84 at a distance from the center of the shaft 30 equal to the focal length of the camera used, divided by the tangent of the depression angle of the photograph 80. The distances for various focal lengths and angles are predetermined and tabulated. The photograph 62 is placed on the left plate 61 and likewise positioned.

The shaft clamping screw 38 is loosened to permit the movement of the right linkage (Figs.

2, 4 and 7) from beneath the right photograph plate 79. The adjusting screw 53 is turned to align the pointer 56 with a graduation on the scale 57 which corresponds to the "tilt" or depression angle of the oblique photograph 80. The left linkage (Figs. 13, 5, 6 and 7) is adjusted to the tilt of the photograph 62 by a corresponding operation of the adjusting screw 126 and pointer 129 on the link 127. The mapping sheet 22 is positioned under the instrument, with the first ground nadir point N under the indentation 89 of the transparent plug 88 in the shaft 30 of the instrument, and the second nadir point N1 under the indentation 186 of the transparent plug 185 in the movable shaft 156, an adjustment of the shaft 156 being made, if necessary. The plotting pencil 179 is set on one of the previously established map points, for example, "A1," the image of which occurs on photograph 80. The linkage is so adjusted that the hairline 84 on the right blade 83 is set over this point "A" at the same time that the plotting pencil 179 is set on its corresponding position A1 on the mapping sheet 22. The linkage is then locked in this position by means of the shaft clamping screw 38 and a critical adjustment by means of the tangent screw 40 serves to bring the hairline 84 exactly over the point "A." The plotting pencil 179 is then moved to other points on photograph 80 and the position of the blade 83 relative to these points is checked. A corresponding adjustment is made for the photograph 62 and the hairline 150. The plotting pencil 179 is set over the point "A" which also appears on photograph 62. The left linkage is adjusted so that the hairline 150 on the left blade 149 falls over the point "A" and the linkage is locked. Other points on photograph 62 are likewise checked for accuracy. In this manner each photograph is oriented correctly with respect to the control points on the sheet 22. Since the hollow shaft 156 is movable only in an arc, the mapping sheet 22 must be rotated about the first nadir point N in order to bring the second nadir point N1 in co-incidence with the indentation 186 in the plug 185 which thereby determines the position of the axis of the movable shaft 156. The stereoscope 200 is now to be adjusted in order to allow three dimensional viewing of the common area covered by the two photographs. In order to accomplish this, the two adjusting arms 224, 225 are moved horizontally and vertically, thus causing the virtual image of the two photographs 80, 62 to be moved in space so as to bring each into a correct relative position with respect to the two eyes of the observer. When this is accomplished a spacial image is observed which is commensurate with the clearness of the photographs. In the area viewed the virtual image of the two lines 84, 150 on the transparent blades 83, 149 form a vertical pointer "XY" which simulates piercing the ground at a definite point (see Fig. 10). The position of this point is represented in map form by the position of the plotting pencil 179. As the operator looks through the stereoscope 200 and moves the plotting pencil 179, this wandering line will appear to move through the area observed, and thus can be used as a guide to follow whatever features are to be mapped. For example: If a shore line is to be drawn, the operator moves the plotting carriage 172 carrying the plotting pencil 179 in its released position so that no line is drawn, until the wandering line or pointer "XY" intersects the shore line at the desired starting position. The spring released knob 180 and pencil 179 are then pressed down and the carriage 172 is moved to cause the virtual image or pointer to follow the shore line.

In this manner a planimetric map is made of the area covered by photographs 80 and 62. The photographs are then removed and photograph 62 is placed on the plate 79 previously occupied by photograph 80 and a third photograph is placed on the left plate 61. The plotting sheet 22 is slid under the instrument until the second ground nadir point N1 is under the stationary shaft 30 and the third ground nadir point N2 is under the movable shaft 156. An orientation of each of these photographs is made to the control point on the mapping sheet 22 and the area mapped in the manner described for the photographs 80 and 62. This procedure is repeated until all the photographs have been used throughout the flight strip and a planimetric map made of the area.

If the area to be mapped is covered by several adjoining strips, the photographs of each are treated in a similar fashion and the physical and cultural features are joined up so as to make a complete map of the area.

*Stereoscope adjustment*

The stereoscope 200 is moved forward or backward and turned to the right or left until the large mirrors 214 and 215 are approximately over the centers of the respective photographs.

The right prism 229 is adjusted by looking to the left edge of the field of view and rotating the right prism 229 in the horizontal plane, by means of the adjusting arm 224 so as to eliminate "y" parallax in the left side of view. The left prism 230 is adjusted by looking to the right side of the field and rotating the left prism 230 by means of the adjusting arm 225 to eliminate "y" parallax in the right side of view.

The right and left adjustments are repeated if necessary to bring common images on a line parallel to the eye base. The conveyance is adjusted to suit the eye by rotating the prisms 229 and 230 by means of the rams 224 and 225 in the vertical plane. The stereoscope is tilted forward or backward to look from the foreground to background, by releasing the clamp 209 and rocking the arm 212 to the desired adjustment.

The above adjustments should give a stereoscopic image commensurate with the clearness of the photographs.

On looking through the stereoscope at the image the two hairlines on the blades or sensing members 83 and 149 appear as a vertical line piercing the earth at some point in the area observed, which point is represented on the map by the position of the drawing element 179. As the drawing element 179 is moved about over the mapping sheet 22 the vertical line is seen to move on the landscape and is used as a pointer to follow features it is desired to map.

A more detailed description of the mechanical linkage for the projection of nadir radials is given in Patent 2,364,082, December 5, 1944, James G. Lewis (one of the joint inventors). Said prior invention provides an apparatus and method for plotting rectified nadir radials by intersecting lines; whereas the present device mechanically projects an infinite number of nadir radials and draws continuous lines while the hairlines are being moved so as to intersect corresponding lines on the two photographs, to draw continuous lines on a mapping sheet.

What we claim is:

1. A stereoblique blind pantograph resolver comprising supports for the mounting of oblique aerial photographs, a plurality of pivotally mounted blades adapted to traverse a photograph on its respective support, a support for a plotting sheet, a manually operated plotting carriage adapted to be moved over said plotting sheet support, plotting arms slidably mounted in said carriage, one of said arms being co-axially mounted on a pivot of one of said blades, means for varying the angular setting between said co-axially mounted arm and blade, a second plotting arm being mounted on a movable pivot, means connecting said movable pivot with a parallel pivot carrying said second blade, means mounted on said second blade pivot for varying the setting between said second blade and said second plotting arm, and means for simultaneously viewing photographs on each of said supports for producing a composite map in true plan form.

2. An apparatus for resolving a plurality of oblique aerial photographs including means for simultaneously viewing two of such photographs to form virtual images, in combination with two photograph supports, two blades, a pivotal bearing shaft for each blade comprising upper and lower members coupled together to permit relative rotation, a common frame structure for supporting said bearing shafts with their axes parallel, means for adjustably clamping each blade to an upper shaft member, a slotted arm secured to each of the upper shaft members, an adjusting arm provided with shaft clamping means on each of said lower shaft members, pairs of links pivotally mounted on each of said lower shaft members connected by transverse spacers, a tangent adjusting screw with an opposing spring pressed plunger mounted in said spacers and adapted to bear against said adjusting arms and provide a means for a critical adjustment of said shafts with respect to said links, means for transmitting movement from said lower shaft members through said pairs of links to said slotted arms carried by said upper shaft members, one of said shafts being provided with an axial bore, a transparent plug provided with centering means in the lower member for use in centering the shaft over a selected mark, and a plotting arm coupled to said lower hollow shaft whereby movement is transmitted from said plotting arm through said lower hollow shaft and said links and arm to the companion upper hollow shaft and thereby cause one of said blades to be moved, a spacer link concentrically mounted about the axis of the lower member of said second shaft, a hollow movable shaft mounted in the free end of said spacer link, an arm secured to said hollow movable shaft, a link pivotally attached to the outer end of said arm, a second arm pivoted to said second link and secured at an opposite end to said lower member of said second shaft, a clamping link, means for locking said spacer link against radial movement, a plotting arm secured to said hollow movable shaft, and a transparent plug provided with centering means in said hollow movable shaft whereby said shaft may be centered over a second selected mark and whereby the various assembled elements may be operated to draw a contour map in line formation from aerial oblique photographs.

3. A stereoblique blind pantograph resolver including two spaced supports for oblique aerial photographs, two pivotally mounted transparent blades each provided with a central longitudinal hairline and each adapted to traverse one of said photograph supports, a support for a plotting sheet, a manually operated plotting carriage adapted to be moved over said plotting sheet support, two plotting arms each slidably mounted in said carriage, one of said arms being co-axially mounted on a pivot of one of said blades, means for varying the angular setting between said co-axially mounted arm and blade, a second plotting arm mounted on a movable pivot, means connecting said movable pivot with a parallel pivot carrying said second blade, means for varying the angular position of said second blade with respect to said second plotting arm and a stereoscopic viewer for simultaneously viewing two photographs each mounted on one of said supports and properly positioned with respect to common points of known geographic positions for producing a composite map in true plan form.

4. An apparatus for resolving a plurality of oblique aerial photographs including a support for a plotting sheet, a plotting carriage having a marking element adapted to traverse said plotting sheet support, two plotting arms mounted to slide in said carriage, steroscopic means for simultaneously viewing photographs which include common terrain, two transparent blades each having a longitudinal hair line pivotally mounted adjacent to the stereoscopic means for simultaneously scanning identical points on said photographs with the aid of said stereoscopic means, and compensating means for adjusting said scanning means for the angle of tilt of the photographs.

5. An apparatus for plotting from a plurality of oblique aerial photographs with the aid of a viewing stereoscope, the improvement which includes two spaced photograph supports, two spaced transparent blades, each provided with a longitudinal hairline and each blade pivotally mounted to be swung over and in a plane parallel with one of said photograph supports, a plotting arm mounted on the same axis as the first of said blades, a second plotting arm mounted on a movable pivot, the pivotal axis of this movable pivot being parallel to the pivotal axis of the second of said blades, a compensating means for adjustably coupling said first blade with said first plotting arm to correspond with the angle of tilt of a first photograph, a second compensating means for adjustably coupling said second blade with said second plotting arm to correspond with the angle of tilt of a second photograph, a mount for a mapping sheet, a plotting carriage provided with a hollow sleeve and with grooves for slidably engaging said plotting arms, and a mapping sheet marking means mounted on said plotting carriage.

6. An apparatus for resolving from a plurality of oblique aerial photographs a composite map in true plan form with the aid of a viewing stereoscope, which includes two spaced photograph supports, a support for a plotting sheet, a plotting carriage provided with map marking means and with a hollow sleeve and grooves, two spaced transparent blades each provided with a longitudinal hairline and each pivotally mounted to be swung over one of said photograph supports, a first plotting arm pivotally mounted on the axis of the first of said blades, means for coupling said first blade with said first plotting arm, a second plotting arm pivotally mounted on the axis of the second of said blades, and a second means for coupling said second blade with said second plotting arm, and means for adjusting each of said coupling means to compensate for the angle of tilt of the photographs, said plotting carriage slidably coupling the intersecting ends of said plotting arms.

7. An apparatus for resolving a plurality of oblique aerial photographs with the aid of a stereoscopic viewer, which includes a plotting sheet support, two spaced photograph supports, two spaced transparent blades each provided with a longitudinal hairline and each mounted to be swung over one of said photograph supports, a first plotting arm pivotally mounted on the axis of the first of said blades, compensating means for adjustably coupling said first blade and said first plotting arm to correspond to the angle of tilt of a first photograph, a second plotting arm mounted on the axis of a second of said blades, a second compensating means for adjustably coupling said second blade with said second plotting arm to correspond to the angle of tilt of a second photograph, a parallelogram element operatively connected with said second plotting arm, a plotting carriage slidably connected with said two plotting arms which converge to a common point, and a marking element mounted in said plotting carriage.

JAMES G. LEWIS.
JAMES L. BUCKMASTER.

REFERENCES CITED

The following references are of record in the file of this patent:

UNITED STATES PATENTS

| Number | Name | Date |
|---|---|---|
| 1,467,163 | Hugershoff | Sept. 4, 1923 |
| 1,827,551 | Wulkow | Oct. 13, 1931 |
| 2,044,114 | Bagley | June 16, 1936 |
| 2,196,723 | Corlett | Apr. 9, 1940 |